United States Patent [19]
Bunce et al.

[11] Patent Number: 5,374,310
[45] Date of Patent: Dec. 20, 1994

[54] HYDROLYZED CHLOROSILICON BY-PRODUCT ADDITION TO CEMENT

[75] Inventors: Timothy R. Bunce, South Glamorgan, United Kingdom; Ajay K. Dhaul, Carrollton, Ky.; Roland L. Halm, Madison; Richard G. Johnson, Hanover, both of Ind.; Ronald E. Lund, Midland, Mich.

[73] Assignee: Dow Corning Corporation, Midland, Mich.

[21] Appl. No.: 953,171

[22] Filed: Sep. 29, 1992

[51] Int. Cl.$^5$ .............................. C04B 7/02; C04B 7/06
[52] U.S. Cl. .................................. 106/739; 106/745; 106/764; 106/771
[58] Field of Search ............... 106/739, 745, 764, 771, 106/823; C04B 7/02, 7/06

[56] References Cited

U.S. PATENT DOCUMENTS 4,408,030 10/1983 Marko .

OTHER PUBLICATIONS

Chemical Abstract—"Cements Containing Additives of Water Insoluble Organosilicon Powders" Moskvin et al. (1971) Russian Korroz. Betona Aggresivnykh Sredakh, 107–11.
Encyclopedia of Chemical Technology, Kirk-Othmer Eds., John Wiley & Sons, vol. 5, pp. 163–193, 1979. no month.

Primary Examiner—Mark L. Bell
Assistant Examiner—Paul Marcantoni
Attorney, Agent, or Firm—William F. Boley

[57] ABSTRACT

The present invention is an improved process for preparing a portland cement composition where the process comprises heat calcining a mixture comprising a source of calcium and a source of silicon to form clinker. The improvement comprises providing to the process a silicon containing product resulting from the hydrolysis of chlorosilicon by-product as at least a portion of the source of silicon.

14 Claims, 1 Drawing Sheet

HYDROLYZED CHLOROSILICON BY-PRODUCT ADDITION TO CEMENT

BACKGROUND OF INVENTION

The present invention offers an economical and an environmentally sound method for utilizing chlorosilicon by-products. The chlorosilicon by-products are hydrolyzed to form a particulate silicon containing product and the silicon containing product is added to standard processes for preparing portland cement. The silicon containing product can be used to replace all or a portion of the silicon source typically added to such processes. Use of the silicon containing product in processes for preparing portland cement provides for improved process efficiency.

The preparation of portland cement is well known in the art. Portland cement is a hydraulic cement characterized by the ability to set and harden in water. An essential feature of portland cement is the ability on hydration to form with water relatively insoluble bonded aggregations of considerable strength and dimensional stability. Generally, portland cements are manufactured by processing and proportioning suitable raw materials, burning at suitable temperatures to effect clinker formation, and grinding the resulting hard nodules called clinker to the fineness required for an adequate rate of hardening by reaction with water. Portland cement consists mainly of tricalcium silicate and dicalcium silicate. Primarily, two types of raw materials are required: one rich in calcium, such as limestone, chalk, marl, or oyster or clam shells; the other rich in silicon, such as clay, shale, sand, or quartz.

The present invention is an improved process for preparing portland cement where all or a portion of the silicon supplied to the process by silicon sources such as clay, shale, sand, or quartz is replaced by the silicon containing product resulting from the hydrolysis of chlorosilicon by-products. The use of the silicon containing product resulting from the hydrolysis of chlorosilicon by-products as a silicon source in the process offers advantages over the use of standard silicon sources. First, the friable nature of the silicon containing product provides a material that requires low energy input to mill into an appropriate form for use in the process. Second, the silicon containing product has better reactivity in the cement kiln than standard silicon sources and this translates into reduced fuel consumption due to lower reaction temperatures. Third, when the silicon containing product is formed from organochlorosilicon by-products, the organic component present in the silicon containing product can serve as a fuel source for the process. Fourth, use of the silicon containing product in the process can enhance removal of alkali deposits from the cement kiln preventing detrimental coatings on process equipment and permitting the production of low-alkalinity clinker.

Processes for preparing the silicon containing products useful in the present process are described by Marko, U.S. Pat. No. 4,408,030, issued Oct. 4, 1983, and are incorporated by reference herein.

SUMMARY OF INVENTION

The present invention is an improved process for preparing a portland cement composition where the process comprises heat calcining a mixture comprising a source of calcium and a source of silicon to form clinker. The improvement comprises providing to the process a silicon containing product resulting from the hydrolysis of chlorosilicon by-product as at least a portion of the source of silicon.

DESCRIPTION OF INVENTION

Figure 1:
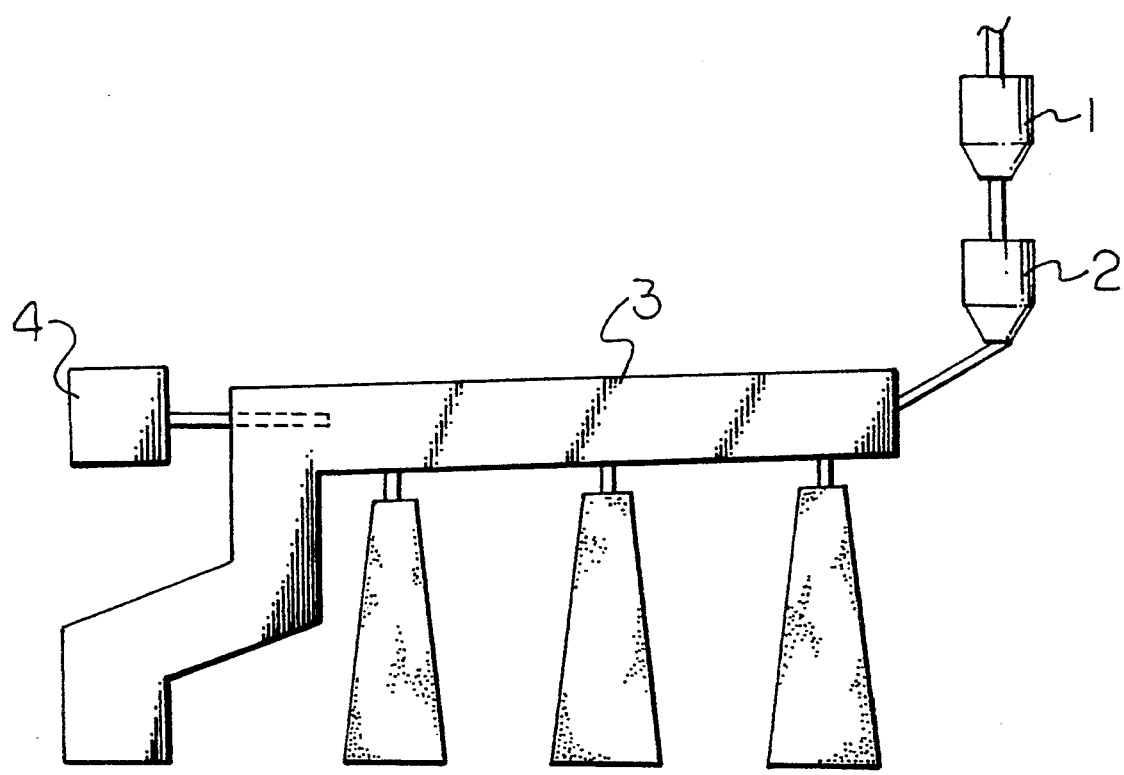
FIG. 1 is a schematic representation of an apparatus suitable for preparing clinker from which Portland cement can be made.

The present invention is an improved process for preparing a portland cement composition where the process comprises heating a mixture comprising a source of calcium and a source of silicon to form clinker. The improvement comprises providing to the process a silicon containing product resulting from the hydrolysis of chlorosilicon by-product as at least a portion of the source of silicon.

Generally, portland cements are manufactured by processing and proportioning suitable raw materials, burning (typically referred to as clinkering), and grinding the resulting nodules called clinker to the fineness required for an adequate rate of hardening by reaction with water.

Typical process and equipment for preparing portland cement are described, for example, in the Encyclopedia of Chemical Technology, Kirk-Othmer Eds., John Wiley and Sons, Vol., 5, p. 163-193, 1979. and are incorporated by reference herein. One such apparatus for preparing clinker from which portland cement can be formed is illustrated in present FIG. 1. The apparatus comprises preheater 1 with an exit port connected to the feed port of flash furnace 2. Flash furnace 2 has an exit port connected to the low-temperature feed zone of rotating kiln 3. The opposite end of rotating kiln 3 is a high temperature zone connected to heat source 4. Preheater 1, flash furnace 2, rotating kiln 3, and heat source 4 can all be of any standard design.

The present process can be run as a wet or as a dry process. In a typical process for preparing clinker from which portland cement can be formed, properly sized and proportioned feed materials are fed into preheater 1. Hot gases originating in flash furnace 2 and rotating kiln 3 pass through preheater 1 causing a partial calcining of the feed materials. The partially calcined feed materials are then passed to flash furnace 2 where additional calcining occurs. The substantially calcined materials are then passed into rotating kiln 3 where additional calcining occurs to produce clinker suitable for the production of portland cement. The resultant clinker is cooled, mixed with a minor component of gypsum, and ground to a suitable fineness to form portland cement.

Portland cement generally contains the following compounds: tricalcium silicate, dicalcium silicate, tricalcium aluminate and tetracalcium aluminoferrite. A typical portland cement is formed from a feed composition containing 60-70 weight percent (Wt %) CaO, 18-Wt % $SiO_2$, 3-8 Wt % $Al_2O_3$, 2-6 Wt % $Fe_2O_3$, and other minor components.

The source of calcium can be, for example, limestone, chalk, marl, oyster shell, or clam shell. The source of aluminum can be, for example, an aluminum oxide containing ore. The source of iron can be, for example, an iron oxide containing ore.

Those skilled in the art recognize that $SiO_2$ is a ubiquitous material often present in combination with other feed materials to the process. However, to achieve the desired level of silicon in the process it is often necessary to add a source of silicon to the process. Materials such as clay or shale can be used as a source of silicon to the process. However, these materials can vary widely as to physical form and as to chemical composition often containing alumina and iron compounds which must be broken down in the kiln. This variation in the physical and chemical form of these sources of silicon can complicate their use in the process. Sand can be a relatively consistent material physically and a relatively chemically pure source of silicon for the process. However, sand is very abrasive and tends to wear out grinding mills, rollers, and kiln liners. In addition, sand contains mainly quartz which is a very stable unreactive form of silica. Combination of this type of silicon in the process tends to be difficult, and in many cases a raw meal that contains sand as one of the components must be ground finer than a feed composition without sand.

The inventors have found that the particulate silicon containing product resulting from the hydrolysis of chlorosilicon by-products can serve as a source of silicon for processes for the making of portland cement. The silicon containing product does not contain hard to break down alumina and iron compounds, is more reactive than quartz, and is friable so that it can be easily milled. In addition, the silicon containing product can add calorific value to the process.

The silicon containing product can be added to the process at any time up to and including the final calcining of the clinker. The silicon containing product can be added, for example, during initial milling and preparation of the feed materials for addition to the process. Suitably sized silicon containing product can be added, for example, to the preheater stage, the flash furnace stage, the low-heat zone of the kiln, the high-heat zone of the kiln or at an intermediate-heat zone between the low- and high-heat zones of the kiln.

All or a portion of the silicon requirement of the portland cement composition can be provided by the silicon containing product. In a preferred embodiment of the present invention, about 25 weight percent to 100 weight percent of the silicon required in the portland cement is provided by the silicon containing product.

Silicon containing products useful in the present process are described in Marko, U.S. Pat. No. 4,408,030, issued Oct. 4, 1983, which is incorporated herein by reference.

The present process is particularly useful as a means of recovering value from chlorosilicon containing by-products generated during the commercial production of silicone polymers. The chlorosilicon by-products can be from, for example, a process for reacting silicon metalloid with hydrogen chloride to form chlorosilanes. The chlorosilicon by-products can be from what is commonly called the "direct process" where an organochloride such as methyl chloride is reacted with silicon metalloid to form organochlorosilanes. The chlorosilicon by-products can include, for example, distillation residues, off-specification materials, and excess chlorosilanes.

The following discussion of chlorosilicon by-products and processes for hydrolyzing to a particulate silicon containing product is provided to further illustrate the present invention and is not intended to limit the scope of U.S. Pat. No. 4,408,030 as incorporated herein.

In a preferred process, the chlorosilicon by-product has an SiCl functionality of the material to be hydrolyzed greater than or equal to 2.8. The average SiCl functionality of the material to be hydrolyzed can be kept within the prescribed limit by determining the average SiCl functionality of the appropriate chlorosilicon by-product and blending with other chlorosilicon by-products to arrive at the desired average SiCl functionality. For the present invention, the term "SiCl functionality" of a given chlorosilicon by-product is defined as the number of Si—Cl bonds in the chlorosilicon compound. For example, the SiCl functionality, f, of several chlorosilicon compounds is given as follows: $R_3SiCl$, f=1; $R_2SiCl_2$, f=2; $RSiCl_3$, f=3; $SiCl_4$, f=4; $RCl_2SiSiCl_2R$, f=4; $RClSiCiClR_2$, f=3; $RCl_2SiOSiCl_3$, f=5; and $Cl_3SiSiCl_3$, f=6; where R is a non-chlorine organic radical. The average SiCl functionality of a chlorosilicon by-product is the weighted average of SiCl functionality of all Si—Cl containing compounds in the by-product.

The chlorosilicon compounds that may be present within the chlorosilicon by-product include, for example, organic substituted and non-organic substituted silanes, disilanes, disiloxanes, silane oligomers, siloxane oligomers, silphenylenes and silalkylenes in which at least one Si—Cl bond is present. In addition to the above named chlorosilicon compounds, the chlorosilicon by-product may contain, for example, silicon metal fines, metallic copper fines, metal salts, and silicon containing compounds without any Si—Cl bonds.

The chlorosilicon by-product with the appropriate average SiCl functionality is added to an aqueous medium which is agitated to facilitate hydrolysis. Both the rate of addition of the chlorosilicon by-products to the aqueous medium and the rate of agitation of the resulting mixture can be used to control the particle size of the resulting particulate silicon containing product. The aqueous medium may consist of only water initially, in which case the hydrogen chloride formed by the hydrolysis dissolves in the water. The aqueous medium may initially contain hydrogen chloride. The term "aqueous" means that the medium contains essentially water as the component reacting with the chlorosilicon by-products and excludes such organic components as alcohols which are reactive with chlorosilicon by-products. The aqueous medium may be a slurry comprising greater than zero to about 20 percent CaO. The amount of aqueous medium employed can be varied widely so long as sufficient water is employed to completely hydrolyze the chlorosilicon by-products.

The hydrolysis is to be carried out at a temperature between 20° C. and the boiling point of the aqueous medium. It is preferred that the hydrolysis be carried out at a temperature within a range of about 60° C. to 105° C.

As the hydrolysis progresses, a particulate silicon containing product separates from the aqueous medium. The silicon containing product may be removed from the aqueous medium by any convenient manner such as filtration, phase separation, or centrifugation. In a preferred embodiment of this invention, the solid silicon containing product is washed with water one or more times to reduce the chloride content of the product.

The following examples are offered to illustrate the present invention. The examples are not intended to limit the claims provided herein.

EXAMPLE 1

A high-boiling chlorosilicon by-product resulting from the reaction of silicon metalloid with methyl chloride was hydrolyzed with a 15 percent aqueous lime slurry. The high-boiling chlorosilane by-product was the fraction remaining in the bottom of a still after distilling off the monosilane fraction. The high-boiling chlorosilicon by-product was further strip distilled to separate it from solids. A typical composition for major components of the strip distilled high-boiling chlorosilicon by-product (hereafter referred to as chlorosilicon by-product) is presented in Table 1a.

TABLE 1a

| Composition of Chlorosilicon By-Product | |
|---|---|
| Component | Weight % |
| Methylchlorodisilanes | 60.0 |
| Disilylmethylenes | 8.0 |
| Unidentified High Boilers | 25.3 |
| Solids | 6.7 |

A volume of the chlorosilicon by-product was added to four times the volume of a slurry comprising 15 weight percent lime in water, with constant stirring of the resultant mixture. After completion of addition of the chlorosilicon by-product, stirring of the mixture was continued for an additional 30 minutes. The mixture was filtered and a black, friable, particulate solid having a particle size of about 1 mm to 10 mm in diameter was recovered (hereafter referred to as silicon containing product). A sample of the silicon containing product was dried at 105° C. and analyzed by X-ray fluorescence to determine its chemical composition. A sample of the silicon containing product was analyzed for chloride content by titration with silver nitrate. The results are reported on an oxide basis, except for chloride and carbon, in Table 1b.

TABLE 1b

| Composition of Silicon Containing Product | |
|---|---|
| Component | Weight % |
| $SiO_2$ | 55.21 |
| $Al_2O_3$ | 1.19 |
| $Fe_2O_3$ | 0.07 |
| CaO | 7.93 |
| MgO | 0.41 |
| $K_2O$ | 0.04 |
| $Na_2O$ | 0.03 |
| $SO_3$ (total) | 0.12 |
| $P_2O_5$ | 0.03 |
| $TiO_2$ | 0.05 |
| Cl | 12.87 |
| C | 12.32 |
| Unidentified | 9.73 |

A test mix comprising on a weight basis 87.2% limestone, 9.4% clay, 0.7% iron ore, and 2.7% of the silicon containing product was formed. Also, a control mix comprising on a weight basis 88.3% limestone, 9.5% clay, 0.7% iron ore, and 1.5% sand was formed. These mixes were ground in a laboratory pebble mill to a nominal fineness of 80% of the particle weight having a diameter less than 0.07 mm and then analyzed by X-ray fluorescence and silver nitrate titration for chemical composition, as previously described. The chemical compositions of these mixes are provided in Table 1c under the headings "Test Mix" and "Control Mix." The test and control mix were then combined with 0.9 weight percent coal ash. The chemical composition of the test mix and control mix after combination with the coal ash is provided in Table 1 c in the columns labelled "Test Mix+Ash" and "Control Mix+Ash" respectively. Values are reported as a weight percent of the weight of the composition after drying at 105° C.

TABLE 1c

| Chemical Composition of Test and Control Mixes | | | | |
|---|---|---|---|---|
| Component | Test Mix Weight % | Test Mix + Ash Weight % | Control Mix Weight % | Control Mix + Ash Weight % |
| $SiO_2$ | 20.97 | 21.18 | 21.02 | 21.23 |
| $Al_2O_3$ | 5.12 | 5.32 | 5.09 | 5.29 |
| $Fe_2O_3$ | 3.72 | 3.77 | 3.72 | 3.77 |
| CaO | 65.74 | 64.99 | 65.73 | 64.98 |
| MgO | 1.43 | 1.43 | 1.43 | 1.43 |
| $K_2O$ | 0.93 | 0.94 | 0.93 | 0.94 |
| $Na_2O$ | 0.19 | 0.19 | 0.19 | 0.19 |
| $SO_3$ | 1.12 | 1.38 | 1.11 | 1.37 |
| Cl | 0.36 | | 0.02 | |
| Other | 0.78 | 0.80 | 0.78 | 0.80 |

Samples of the mixes combined with 0.9 weight percent coal ash were wetted with distilled water. The samples were then rolled on a glass plate to form cylindrical shaped samples. The cylindrical shaped samples were dried at 105° C. and then inserted into platinum boats and calcined at 982° C. for 30 minutes. The calcined samples were then placed into a muffle furnace maintained at 1427° C. Duplicate samples of the test mix and of the control mix were removed at 10, 30 and 60 minutes after being placed in the furnace. The test and control samples were cooled in a desiccator and then ground to a nominal particle size less than 0.15 mm in diameter. The samples were maintained in sealed plastic bags until they were analyzed for free lime (CaO), volatile alkalies, and sulfur by X-ray fluorescence. The results of this analysis are presented in Table 1d. The free CaO is presented as a weight percent (Wt %) of the total CaO present in the sample. The volatile alkalies i.e. $K_2O$ and $Na_2O$ and the volatile sulfur ($SO_3$) are presented as a weight percent of that present in the test and control samples prior to placing in the muffle furnace. All results are the mean of two determinations.

TABLE 1d

| Free Lime and Volatile Alkalies and Volatile Sulfur In Calcined Samples | | | | | | | | |
|---|---|---|---|---|---|---|---|---|
| | Control Samples | | | | Test Samples | | | |
| | | Wt % Volatilized | | | | Wt % Volatilized | | |
| Time (Min.) | Free CaO | $K_2O$ | $Na_2O$ | $SO_3$ | Free CaO | $K_2O$ | $Na_2O$ | $SO_3$ |
| 10 | 3.9 | 18 | 0 | 16 | 2.3 | 35 | 50 | 15 |
| 30 | 1.4 | 48 | 8 | 37 | 0.7 | 89 | 50 | 50 |
| 60 | 0.4 | 74 | 25 | 62 | 0.3 | 93 | 57 | 66 |

The free lime results for the test samples show considerably lower free lime, indicating improved burnability. The volatility data demonstrate the increased volatility of $K_2O$ and $Na_2O$ in the process.

In addition, a dried 10 g sample of the solid silicon containing product of the composition reported in Table 1b was tested for caloric value by a standard oxygen bomb colorimetric technique. The sample was found to have a caloric value of $1649 \times 10^4$ J/kg on a dry basis.

EXAMPLE 2

The silicon containing product of Example 1 was washed with water to prepare a silicon containing product reduced in chloride. The washed sample was dried at 105° C. and analyzed by X-ray fluorescence for its chemical composition. The results, calculated as described in Example 1, are provide in Table 2a.

TABLE 2a

Composition of Dried Solid Silicon Containing Product

| Component | Weight % |
|---|---|
| $SiO_2$ | 85.02 |
| $Al_2O_3$ | 1.53 |
| $Fe_2O_3$ | 0.12 |
| CaO | 1.28 |
| MgO | 0.15 |
| $K_2O$ | 0.03 |
| $Na_2O$ | 0.05 |
| $SO_3$ (total) | 0.11 |
| $P_2O_5$ | 0.05 |
| $TiO_2$ | 0.08 |
| Cl | 1.46 |
| C | 8.52 |
| Unidentified | 1.59 |

A test mix comprising on a weight basis 88.2% limestone, 9.3% clay, 0.7% iron ore, and 1.8% of the dried silicon containing product was formed. The test mix was ground in a laboratory pebble mill to a nominal fineness of 80% by weight having a particle size less than 0.07 mm in diameter and then analyzed by X-ray fluorescence. The chemical composition of this test mix is provided in Table 2b in the column labelled "Test Mix." The test mix was combined with 0.9 weight percent coal ash. The chemical composition of the test mix after combination with the coal ash is provided in Table 2b in the column labelled "Test Mix+Ash." The results are reported as the loss free composition remaining after heating the samples at 900° C. for one hour. The test mix before the heating contained 0.046 weight percent chloride and 0.256 weight percent carbon.

TABLE 2b

Chemical Composition of Mix

| Component | Test Mix Weight % | Test Mix + Ash Weight % |
|---|---|---|
| $SiO_2$ | 20.96 | 21.17 |
| $Al_2O_3$ | 5.09 | 5.29 |
| $Fe_2O_3$ | 3.7 | 3.75 |
| CaO | 65.82 | 65.07 |
| MgO | 1.42 | 1.42 |
| $K_2O$ | 0.93 | 0.94 |
| $Na_2O$ | 0.18 | 0.18 |
| $SO_3$ | 1.11 | 1.37 |
| Other | 0.79 | 0.81 |

Samples of the test mix combined with 0.9 weight percent coal ash were wetted with distilled water and cylindrical shaped test samples formed, dried, and calcined as described in Example 1. The calcined samples were placed in a muffle furnace maintained at 1427° C. Duplicate test samples were removed from the furnace at 10, 30, and 60 minutes after being placed in the furnace. The removed test samples were handled and prepared for analysis as described in Example 1. The results of the analysis are presented in Table 2C. The headings of Table 2c are as described for Table 1d.

TABLE 2c

Free Lime and Volatile Alkalies and Volatile Sulfur in Calcined Samples

| Time (Min.) | Free CaO | Wt % Volatilized $K_2O$ | Wt % Volatilized $Na_2O$ | Wt % Volatilized $SO_3$ |
|---|---|---|---|---|
| 10 | 2.85 | 30 | 21 | 20 |
| 30 | 0.80 | 53 | 29 | 43 |
| 60 | 0.18 | 79 | 43 | 64 |

For comparison purposes, the results presented in Table 2c can be compared to the control sample values found in Table 1d. The lower free lime results for the test sample indicate improved burnability. Also, the data demonstrate the increased volatility of $K_2O$ and $Na_2O$ in the process.

In addition, a dried 10 g sample of the solid silicon containing product of the composition described in Table 2a was tested for caloric value as described in Example 1. The sample was found to have a caloric value of $5538 \times 10^3$ J/kg on a dry basis.

EXAMPLE 3

The chlorosilicon by-product described in Table 1a of Example 1 was hydrolyzed with four times volume of aqueous 22 weight percent HCl. The resultant silicon containing product was an off-white, friable, particulate solid having a particle size of about 1 mm to 10 mm in diameter. A sample of the silicon containing product was dried at 105° C. and analyzed by X-ray fluorescence for its chemical composition. The results, calculated as described in Example 1, are provided in Table 3a.

TABLE 3a

Composition of Solid Silicon Containing Product

| Component | Weight % |
|---|---|
| $SiO_2$ | 80.80 |
| $Al_2O_3$ | 1.17 |
| $Fe_2O_3$ | 0.26 |
| CaO | 0.00 |
| MgO | 0.00 |
| $K_2O$ | 0.02 |
| $Na_2O$ | 0.07 |
| $SO_3$ (total) | 0.07 |
| $P_2O_5$ | 0.03 |
| $TiO_2$ | 0.63 |
| Cl | 0.73 |
| C | 21.07 |
| Unidentified | 0.00 |

A test mix comprising on a weight basis 88.1% limestone, 9.4% clay, 0.7% iron ore, and 1.8% of the silicon containing product was formed. The test mix was ground in a laboratory pebble mill to a nominal fineness of 80% by weight having a particle diameter less than 0.07 mm in diameter and then analyzed by X-ray fluorescence for chemical composition. The chemical composition of this test mix is provided in Table 3b in the column labelled "Test Mix." The test mix was combined with 0.9 weight percent coal ash. The chemical composition of the test mix after combination with the coal ash is provided in Table 3b in the column labelled "Test Mix+Ash." The results are reported as the loss free composition remaining after heating the samples at 900° C. for one hour. The test mix before the heating contained 0.031 weight percent chloride and 0.482 weight percent carbon.

TABLE 3b

| Chemical Composition of Raw Mix | | |
|---|---|---|
| Component | Test Mix Weight % | Test Mix + Ash Weight % |
| $SiO_2$ | 20.90 | 21.12 |
| $Al_2O_3$ | 5.17 | 5.36 |
| $Fe_2O_3$ | 3.74 | 3.79 |
| CaO | 65.74 | 65.00 |
| MgO | 1.42 | 1.42 |
| $K_2O$ | 0.93 | 0.94 |
| $Na_2O$ | 0.19 | 0.19 |
| $SO_3$ | 1.11 | 1.37 |
| Other | 0.80 | 0.81 |

Samples of the test mix combined with 0.9 weight percent coal ash were wetted with distilled water and cylindrical shaped test samples were formed, dried, and calcined as described in Example 1. The calcined samples were placed in a muffle furnace maintained at 1427° C. Duplicate test samples were removed from the furnace at 10, 30, and 60 minutes after being place in the furnace. The removed test samples were handled and prepared for analysis as described in Example 1. The results of the analysis are presented in Table 3c. The headings of Table 3c are the same as described for Table 1d.

TABLE 3c

| Free Lime and Volatile Alkalies and Volatile Sulfur in Calcined Samples | | | | |
|---|---|---|---|---|
| | Free | Wt % Volatilized | | |
| Time (Min.) | CaO | $K_2O$ | $Na_2O$ | $SO_3$ |
| 10 | 3.91 | 28 | 20 | 11 |
| 30 | 1.36 | 58 | 33 | 41 |
| 60 | 0.45 | 83 | 47 | 68 |

For comparison purposes, the results presented in Table 3c can be compared to the control sample values found in Table 1d. The free lime values were comparable to the control sample. In comparison to the control sample, the test sample demonstrated increased volatility of $K_2O$ and $Na_2O$.

In addition, a dried 10 g sample of the silicon containing product of the composition described in Table 3a was tested for caloric value as described in Example 1. The sample was found to have a caloric value of $1782 \times 10^4$ J/kg on a dry basis.

EXAMPLE 4

The chlorosilicon by-product described in Table 1a of Example 1 was filtered to removed solids and then hydrolyzed with aqueous HCl as described in Example 3. The silicon containing product was a black, friable, particulate having a particle size of about 1 mm to 10 mm in diameter. A sample of the silicon containing product was dried at 105° C. and analyzed by X-ray fluorescence for chemical composition. The results, calculated as described in Example 1, are provided in Table 4a.

TABLE 4a

| Composition of Silicon Containing Product | |
|---|---|
| Component | Weight % |
| $SiO_2$ | 72.50 |
| $Al_2O_3$ | 1.42 |
| $Fe_2O_3$ | 0.01 |
| CaO | 0.02 |
| MgO | 0.00 |
| $K_2O$ | 0.02 |
| $Na_2O$ | 0.04 |
| $SO_3$ (total) | 0.08 |
| $P_2O_5$ | 0.03 |
| $TiO_2$ | 0.09 |
| Cl | 1.23 |
| C | 15.97 |
| Unidentified | 8.35 |

A test mix comprising on a weight basis 87.9% limestone, 9.3% clay, 0.7% iron ore, and 2.1% of the silicon containing product was formed. The test mix was ground in a laboratory pebble mill to a nominal fineness of 80% by weight having a diameter less than 0.07 mm and then analyzed by X-ray fluorescence. The chemical composition of this test mix is provided in Table 4b in the column labelled "Test Mix." The test mix was combined with 0.9 weight percent coal ash. The chemical composition of the test mix after combination with the coal ash is provided in Table 4b in the column labelled "Test Mix+Ash." The results are reported as the loss free composition remaining after heating the samples at 900° C. for one hour. The test mix before the heating contained 0.043 weight percent chlorine and 0.438 weight percent carbon.

TABLE 4b

| Chemical Composition of Mix | | |
|---|---|---|
| Component | Test Mix Weight % | Test Mix + Ash Weight % |
| $SiO_2$ | 20.98 | 21.20 |
| $Al_2O_3$ | 5.09 | 5.28 |
| $Fe_2O_3$ | 3.71 | 3.77 |
| CaO | 65.77 | 65.01 |
| MgO | 1.42 | 1.42 |
| $K_2O$ | 0.93 | 0.94 |
| $Na_2O$ | 0.20 | 0.20 |
| $SO_3$ | 1.11 | 1.37 |
| Other | 0.79 | 0.81 |

Samples of the test mix combined with 0.9 weight percent coal ash were wetted with distilled water and cylindrical shaped test samples formed, dried, and calcined as described in Example 1. The calcined samples were placed in a muffle furnace maintained at 1427° C. Duplicate test samples were removed from the furnace at 10, 30, and 60 minutes after being placed in the furnace. The removed test samples were handled and prepared for analysis as described in Example 1. The results of the analysis are presented in Table 4c. The headings of Table 4c are as previously described for Table 1d.

TABLE 4c

| Free Lime and Volatile Alkalies and Volatile Sulfur in Calcined Samples | | | | |
|---|---|---|---|---|
| | Free | Wt % Volatilized | | |
| Time (Min.) | CaO | $K_2O$ | $Na_2O$ | $SO_3$ |
| 10 | 1.92 | 32 | 14 | 18 |
| 30 | 0.43 | 58 | 29 | 43 |
| 60 | 0.16 | 82 | 43 | 66 |

For comparison purposes, the results presented in Table 4c can be compared to the control sample values found in Table 1d. The lower free lime results for the test sample indicate improved burnability. Potassium volatility is slightly better than that of the control, while sodium volatility is comparable to the control value.

In addition, a dried 10 g sample of the silicon containing product of the composition described in Table 4a was tested for caloric value as described in Example 1. The sample was found to have a caloric value of $2216 \times 10^4$ J/kg on a dry weight basis.

We claim:

1. In a process for preparing a portland cement composition where the process comprises heating a mixture comprising a source of calcium and a source of silicon, the improvement comprising providing to the process a silicon containing product resulting from the hydrolysis of chlorosilicon by-product as at least a portion of the source of silicon.

2. A process according to claim 1, where the mixture comprising the source of calcium and the source of silicon further comprises a source of aluminum and a source of iron.

3. A process according to claim 2, where the mixture comprises limestone, clay, silicon dioxide, and aluminum oxide and an iron oxide.

4. A process according to claim 1, where the source of silicon comprises 25 weight percent to 100 weight percent of the silicon containing product.

5. A process according to claim 1, where the chlorosilicon by-product is from a process for reacting silicon metalloid with hydrogen chloride to form chlorosilanes.

6. A process according to claim 1, where the chlorosilicon by-product is from the reaction of an organochloride with silicon metalloid to form organochlorosilanes.

7. A process according to claim 1, where the chlorosilicon by-product has an SiCl functionality greater than or equal to 2.8.

8. A process according to claim 1, where the silicon containing product is formed by contact of the chlorosilane by-product with water.

9. A process according to claim 1, where the silicon containing product is formed by contact of the chlorosilane by-product with an aqueous slurry of calcium oxide.

10. A process according to claim 1, where the silicon containing product is washed with water to reduce the chloride content of the silicon containing product.

11. A process for preparing clinker suitable for use in a portland cement composition, the process comprising heat calcining a mixture comprising an oxide of calcium, an oxide of aluminum, an oxide of iron, and oxide of silicon, and a silicon containing product resulting from the hydrolysis of chlorosilicon by-product, where the silicon containing product comprises about three weight percent to 100 weight percent of silicon added to the process.

12. A process according to claim 1, where the silicon containing product is formed by contact of the chlorosilicon by-product with aqueous hydrogen chloride.

13. A process according to claim 1, where chloride present in the silicon containing product extracts alkali deposits from a cement kiln to produce a low-alkaline clinker.

14. In a process for preparing a portland cement composition where the process comprises heating a mixture comprising a source of calcium and a source of silicon, the improvement comprising providing to the process as a source of silicon a silicon containing product resulting from the hydrolysis of chlorosilicon by-product where the silicon containing product comprises about three weight percent to 100 weight percent of silicon added to the process.

* * * * *